July 4, 1961

C. PONSAR 2,990,757

PHOTOGRAPHIC OR CINEMATOGRAPHIC APPARATUS AND THE LIKE

Filed April 20, 1956

C. PONSAR 2,990,757

PHOTOGRAPHIC OR CINEMATOGRAPHIC APPARATUS AND THE LIKE

Filed April 20, 1956

United States Patent Office 2,990,757
Patented July 4, 1961

2,990,757
PHOTOGRAPHIC OR CINEMATOGRAPHIC APPARATUS AND THE LIKE
Christian Ponsar, Paris, France, assignor to Societe de Cartonnages d'Echantillonnage et de Reliure d'Aubervilliers (SCERA), Aubervilliers, France, a corporation of France
Filed Apr. 20, 1956, Ser. No. 579,535
Claims priority, application France Apr. 21, 1955
1 Claim. (Cl. 95—10)

In order to vary the time of exposure of photographic or cinematographic apparatus, it is known to employ devices known as exposure-meters which enable the time of exposure to be determined as a function of the average illumination of the subject, of the diaphragm opening, of the sensitivity of the emulsion of the film employed, of the characteristics of the lens and of the filters utilized.

The information given by these devices is however only approximate, especially in the case of long exposure times, during which the lighting of the subject may vary.

In such cases, devices known as light-integrators are preferably used, comprising a photo-electric cell which is placed beside the subject to be photographed and is thus subjected to the same illumination as the subject.

There is thus obtained automatically the duration of the time exposure, on condition however that the light integrator is previously regulated as a function of the sensitivity of the film employed, of the scale of reproduction and of the characteristics of the lens and of the filters.

The invention has for its object an improvement in photographic or cinematographic apparatus, which consists in incorporating the photo-electric cell of the integrator within the interior of the dark chamber of the apparatus as close as possible to the sensitive surface, and in arranging it in such manner that it is subjected to a beam of light which has passed through the lens of the apparatus or through a similar lens, and in causing the closure of the shutter to be directly controlled by the integrator device associated with the photo-electric cell. In this way, when the scale of reproduction, the diaphragm, the value of the filters, the distance of the subject, the lighting of the subject or the orientation of the apparatus are changed, the cell is subjected in identically the same manner to the same variations of light as the film or the plate, and it is not necessary to proceed to a further adjustment of the integrator, as is the case at the present time.

In the case of apparatus of large size, there is no difficulty in arranging the photo-electric cell inside the dark chamber and in illuminating it directly by a portion of the beam of light which has passed through the lens. In the case of apparatus of small size, in which the presence of the cell may cause difficulties, a part of the light beam is preferably deflected, for example by a non-silvered mirror, towards the cell which is arranged laterally, or an auxiliary lens is used the diaphragm of the auxiliary lens being coupled to that of the first lens.

Finally, it is also possible to associate the electrical equipment of the integrator with the photographic or cinematographic apparatus, by making use preferably of devices of the transistor type.

The invention will now be described in more detail in connection with the forms of embodiment shown by way of examples in the attached drawings, in which.

Figure 1:
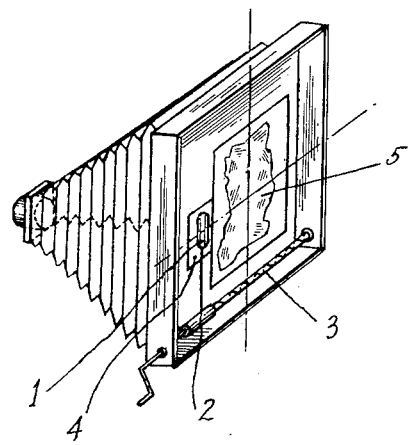
FIG. 1 is a diagram showing the principles of a plate camera with an associated cell.
Figure 2:
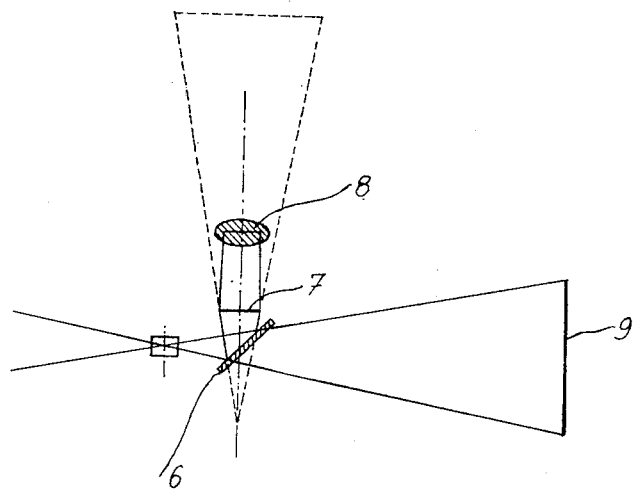
FIG. 2 is a diagram showing the principles of a photographic apparatus of small size with an associated cell.

Referring now to the drawings, FIG. 1 shows an example of a photographic apparatus of large size, in which it is an easy matter to arrange the photo-electric cell in the dark chamber, the cell being connected to a suitable integrator device mounted externally to the apparatus and not shown on the drawing. The photo-electric cell 1 may, for example, be placed on a support 2 which can be displaced transversely, for example by means of an endless screw 3, so that along its travel, the cell is movable so as to be always located as close as possible to the plane of the sensitive surface of the film or plate. A piece of white or coloured paper will be mounted alongside the document or the scene 5 to be photographed to serve as a datum of light intensity, and the cell will be moved so as to place it in the zone of the image 4 of the datum paper.

It will be easy to carry out this adjustment by means of the ground glass with which professional photographic apparatus are generally fitted. When once the shutter has been opened for making the exposure, in accordance with a feature of the invention which will be more explicitly described below, the light-integrator will then control the closure of the shutter as a function of the quantity of light received per unit of surface in the image plane of the clear zone taken as a reference or datum.

As has already been stated, the parameters which have been taken into account up to the present time in calculating the exposure period are thus eliminated.

It will however be observed that, in the case where filters are employed (three-colour selection) it may be necessary to make different adjustments of the integrator, since the photo-electric cells generally used are not sensitive to all the radiations of the spectrum in the same way as in the photographic film.

On the other hand, in making a choice of the photo-electric cell, a preference should be made for a cell which, when placed on the integrator, gives a function $t=f(E)$, where $t$ is the time of integration and E is the illumination, this function being as close as possible to the corresponding function of photographic films: $t=f(E)$ in which $t$ is the time of exposure and E is the illumination.

In the case of amateur photographic apparatus, which does not usually have any provision for a zone of the object considered as a zone of reference shade, it will suffice to expose the cell to the average illumination received by the sensitive surface of the film or plate.

For this purpose, there may for example be arranged within the interior of the photographic apparatus, an unsilvered mirror 6 which reflects a part of the beam of rays (reflected beam) on to a convergent optical system 7 which concentrates the whole of the beam on the sensitive part of the photo-electric cell 8, the refracted part of the beam of light being applied to the direct exposure of the sensitive surface 9 of the film or plate.

The operation of the diaphragm will only be required to be made exceptionally, since the exposure time will be obtained automatically, whatever the value of the diaphragm may be. It will thus be preferable in general to close the diaphragm to the maximum extent and only to open it for the photography of moving objects in which a very short instantaneous exposure is required.

In order to be able to obtain very short (instantaneous) exposure times, it will be necessary to employ a shutter with a very rapid movement, the opening being made at the moment when the operator presses on the release, which release sets at the same time the light integrator, the closure being carried out automatically by the integrator itself.

It is to be observed that an adjustment of the integrator will nevertheless be necessary as a function of the subject photographed depending on the average value of the lighting of the subject; three adjustments may, for example, be provided:

(a) For a subject of very dark mean value;
(b) For a subject of normal average value;
(c) For a subject having a very bright average value.

The invention may also be applied to cinematograph cameras. It is in fact possible to consider the pictures taken by these cameras as a succession of rapid exposures, the duration of these exposures being then automatically controlled by the light-integrator. The advantages are the same as in the previous cases, with the additional fact that the number of pictures taken per second is no longer to be considered in determing the time of exposure.

There will now be described an integrator of a type known per se, but which has been adapted in accordance with the invention so as to permit of the automatic control of the shutter of the photographic or cinematographic apparatus with which is associated the cell of the integrator, in the manner indicated above.

Figure 3:
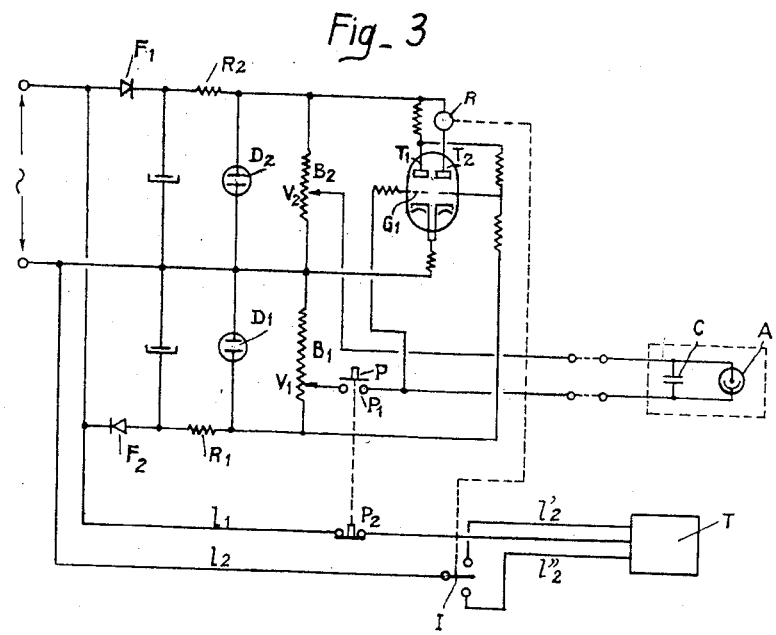
FIG. 3 is a circuit diagram of the integrator device.
Figure 4:
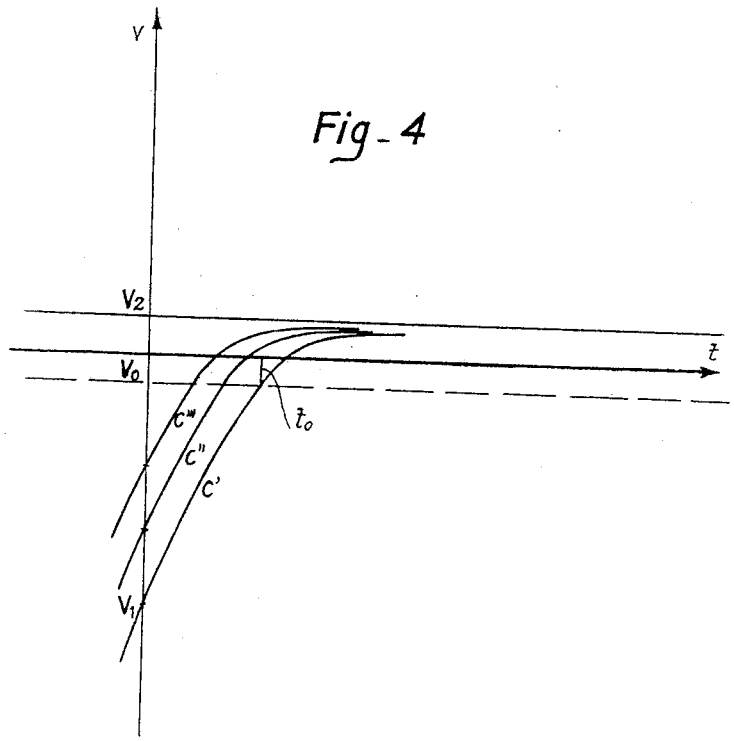
FIG. 4 shows the discharge curves of the condenser at various settings of the adjustment.

In the example of arrangement shown in FIG. 3, the apparatus consists of a photo-electric cell A which, under the action of light, discharges the condenser C which was previously charged; the speed of discharge of this condenser increases as the intensity of the light received by the cell also increases. The potential of one of the plates of the condenser controls the grid $G_1$ of a double triode $T_1$, $T_2$, connected to operate as a Schmitt flip-flop circuit. The anode current of the triode $T_2$ actuates a relay R which controls the change-over switch I. The relay R may also be controlled by the anode current of $T_1$ or again, in the case of a polarised relay with two windings, by the anode currents of $T_1$ and $T_2$, depending on which triode is operative.

In order to regulate the integrator as a function of a given intensity of light, it is possible to act on the discharge time of the condenser C, and thus to reverse the current in the double triode, either by diaphragming the cell A or by placing in front of this cell a smoked coloured glass, or two polarised glasses displaced one with respect to the other, or finally by acting on the charge of the condenser when starting up the apparatus. It is also possible to use condensers C of different capacities.

In the arrangement shown in FIG. 3, the two plates of the condenser are respectively coupled to the moving sliders of the potentiometers $B_1$, $B_2$, which are brought to the potentials $V_1$ and $V_2$; one of these potentiometers is so coupled by means of a push-button switch P. These potentiometers are supplied from the main current through the intermediary of voltage-stabilising tubes $D_1$ and $D_2$ which are themselves supplied with rectified voltage through two resistances $R_1$ and $R_2$ and the dry-plate rectifiers $F_1$, $F_2$.

The push-button P also operates a contact $P_2$ arranged in one of the conductors $L_1$, $L_2$ which supply the apparatus T for the operation of the shutter, the other conductor $L_2$ in the case shown comprising a change-over switch I controlled by the relay R and supplying either the one or the other of the two conductors $L'_2$ and $L''_2$.

In order to set the circuit in operation, the push-button P is depressed, which has the effect of subjecting the plates of the condenser C to the difference in potential $V_2-V_1$ of the sliders of the potentiometers $B_2$ and $B_1$.

The condenser C being charged, the grid $G_1$ is highly negative and paralyses the triode $T_1$, whilst the triode $T_2$ is conductive; the relay R is thus energised and actuates the change-over switch I.

In order to prevent the time taken by the operator in pressing the push-button P from causing an error in the time of integration (the condenser C remains in fact, during this period, subjected to the difference of potential $V_2-V_1$), the push-button P has two contacts, and when the contact $P_1$ is closed by the pressure of the operator, the contact $P_2$ is opened, thus breaking the control circuit of the operated apparatus.

When the push-button P is released, the contact $P_2$ closes and the control device T is fed through the conductors $L_1$ and $L'_2$ and in consequence opens the shutter.

The cell A, being then exposed to light, permits the condenser C to discharge, the potential of the negative plate increases towards the value $B_2$. The grid $G_1$ becomes less negative and releases the triode $T_1$ which paralyses the triode $T_2$ in its turn, the relay R falling so as to actuate the change-over switch I; the control apparatus T is then supplied by the conductors $L'$, $L''_2$, which reverses the direction of the current passing through it and in consequence acts to close the shutter.

The potentiometer $V_1$ enables the charge of the condenser C to be varied when starting up the apparatus. The potentiometer $V_2$ is intended to raise the discharge curves of the condenser C in such manner that the moment at which the double triode changes-over may be sharply defined, which is shown graphically by the fact that if $V_0$ is the value of the potential of the grid $G_1$ for which the double triode changes over, the straight line $V=V_0$ correctly cuts across the discharge curves $C'$, $C''$ and $C'''$ at an angle which is not too acute.

By acting on the potential $V_1$, the operating point passes from the curve $C'$ to the curve $C''$, and from the curve $C''$ to $C'''$.

The curves $C'$, $C''$ and $C'''$ are obtained by lateral movement parallel to the time axis.

I claim:

In a photographic or cinematographic apparatus having at least one lens system, a shutter and dark chamber; a photo-electric cell, means adjustably supporting the photo-electric cell in the path of light from said lens system and in a plane substantially at the image plane of the lens system and adjacent thereto, said cell being constructed and arranged to receive a flux of very limited dimensions in relation to the total luminous flux used for the image formed by said system, a condenser, and a light-integrator device including said photo-electric cell and said condenser and further comprising a double electron tube permitting the discharge of said condenser and coupled to act as a trigger circuit, and means responsive to the discharge of said condenser operatively connected in said light-integrator device to effect the closing of the shutter under the control of the integrator, said last-named means comprising two potentiometers connected to each other in series and connected in parallel with the said condenser, means supplying rectified current to said potentiometers, a relay in the anode circuit of one tube of said trigger circuit, shutter actuating means operatively connected to said relay for actuation thereby, and a push-button having a first contact inserted between said condenser and one of said potentiometers and a second contact inserted between said relay and shutter actuating means.

References Cited in the file of this patent

UNITED STATES PATENTS

| 1,244,159 | Adsit | Oct. 23, 1917 |
|---|---|---|
| 1,980,217 | Mareno | Nov. 13, 1934 |
| 2,058,531 | Tuttle | Oct. 27, 1936 |
| 2,154,324 | Couyoumdjian | Apr. 11, 1939 |
| 2,187,953 | Schmidt | Jan. 23, 1940 |
| 2,194,031 | Riszdorfer | Mar. 19, 1940 |
| 2,201,606 | Bing | May 21, 1940 |
| 2,297,428 | Nuchterlein | Sept. 29, 1942 |
| 2,302,597 | Bing | Nov. 17, 1942 |
| 2,353,218 | Burnham et al. | July 11, 1944 |
| 2,477,235 | Broido | July 26, 1949 |

FOREIGN PATENTS

| 995,117 | France | Aug. 14, 1951 |

OTHER REFERENCES

American Cinematographer Magazine, volume 34, No. 2, February 1953, pages 68, 84, 85 and 86.